US012749193B1

(12) United States Patent
Mathew et al.

(10) Patent No.: US 12,749,193 B1
(45) Date of Patent: Sep. 29, 2026

(54) PERSISTENT COORDINATES SYSTEM FOR IMAGE PROCESSING

(71) Applicant: Lumo Imaging LLC, Potomac, MD (US)

(72) Inventors: Daniel Mathew, Clarksburg, MD (US); Wei-Lun Huang, North Potomac, MD (US); Davood Tashayyod, Potomac, MD (US)

(73) Assignee: Lumo Imaging LLC, Potomac, MD (US)

( * ) Notice: Subject to any disclaimer, the term of this patent is extended or adjusted under 35 U.S.C. 154(b) by 32 days.

(21) Appl. No.: 19/304,274

(22) Filed: Aug. 19, 2025

(51) Int. Cl.
*G06T 7/00* (2017.01)
*G06T 7/11* (2017.01)
(Continued)

(52) U.S. Cl.
CPC .............. *G06T 7/0014* (2013.01); *G06T 7/11* (2017.01); *G06T 7/74* (2017.01); *G06T 7/75* (2017.01); *G06T 19/20* (2013.01); *G06T 2207/10016* (2013.01); *G06T 2207/10024* (2013.01); *G06T 2207/10048* (2013.01);
(Continued)

(58) Field of Classification Search
CPC . G06T 7/0014; G06T 7/11; G06T 7/74; G06T 7/75; G06T 17/20; G06T 19/20; G06T 2207/10016; G06T 2207/10024; G06T 2207/10048; G06T 2207/20101; G06T 2207/20104; G06T 2207/30088; G06T 2207/30096; G06T 2207/30196; G06T 2207/30204; G06T 2219/2004;
(Continued)

(56) References Cited

U.S. PATENT DOCUMENTS

| | | | | |
|---|---|---|---|---|
| 10,482,614 B2 * | 11/2019 | Ben-Yishai | ............ | A61B 34/10 |
| 10,813,715 B1 * | 10/2020 | Chojnowski | .......... | G06F 3/0304 |
| 2012/0206587 A1 * | 8/2012 | Oz | ......................... | A61B 5/444 348/E7.085 |

OTHER PUBLICATIONS

Mengliu Zhao et al. "Skin3D: Detection and longitudinal tracking of pigmented skin lesions in 3D total-body textured meshes", Apr. 2022, Elsevier, Medical Image Analysis, vol. 77, p. 1-10. (Year: 2022).*

(Continued)

*Primary Examiner* — Vincent Rudolph
*Assistant Examiner* — Timothy Choi
(74) *Attorney, Agent, or Firm* — IP Consulting Group; Michael Razavi; Alfred F. Hoyte, Jr.

(57) ABSTRACT

A computer-implemented method and system are disclosed for persistent anatomical localization of surface features on a human body across multiple imaging sessions, poses, and time points. The method generates a template mesh representing a human body surface and determines subject pose from image data using pose estimation cues including joint markers, silhouettes, or other lightweight anatomical indicators. A location of interest is encoded within a local coordinate frame associated with an anatomical segment and projected onto the template mesh to generate a persistent spatial coordinate. The persistent spatial coordinate enables reversible mapping between image space and template mesh space, allowing consistent localization of the anatomical feature across different views and sessions. The persistent spatial coordinate is generated without requiring deformable mesh reconstruction at the time of initial localization.

10 Claims, 4 Drawing Sheets

(a) (b) (c)

(51) Int. Cl.
*G06T 7/73* (2017.01)
*G06T 19/20* (2011.01)

(52) U.S. Cl.
CPC ............... *G06T 2207/20101* (2013.01); *G06T 2207/30088* (2013.01); *G06T 2207/30096* (2013.01); *G06T 2207/30196* (2013.01); *G06T 2207/30204* (2013.01); *G06T 2219/2004* (2013.01); *G06T 2219/2021* (2013.01)

(58) Field of Classification Search
CPC .......... G06T 2219/2021; A61B 5/0064; A61B 5/441; A61B 5/444; A61B 90/364; A61B 90/367
See application file for complete search history.

(56) References Cited

OTHER PUBLICATIONS

Fang Zhao et al. "Human Parsing Based Texture Transfer from Single Image to 3D Human via Cross-View Consistency", Dec. 2020, ACM, 34th Conference on Neural Information Processing Systems, NeurIPS 2020, p. 1-12 (Year: 2020).*

Wehrbein et al., "Personalized 3D Human Pose and Shape Refinement", Oct. 2023, IEEE, 2023 IEEE/CVF International Conference on Computer Vision Workshops (ICCVW), 4191-4201. (Year: 2023).*

Groueix et al. "3D-Coded: 3D Correspondences by Deep Deformation", Oct. 2018, Springer, ECCV 2018, LNCS 11206, p. 235-251. (Year: 2018).*

Francese et al., "A mobile augmented reality application for supporting real-time skin lesion analysis based on deep learning", May 2021, Springer, Journal of Real-Time Image Processing, vol. 18, p. 1247-1259. (Year: 2021).*

Uthoff et al., "Point-of-care, multispectral, smartphone-based dermascopes for dermal lesion screening and erythema monitoring", Jun. 2020, SPIE, Journal of Biomedical Optics, vol. 25, is. 6, p. 066004-1-066004-21. (Year: 2020).*

Bogo et al., "Automated Detection of New or Evolving Melanocytic Lesions Using a 3D Body Model", 2014, Springer, MICCAI 2014, Part I, LNCS 8673, p. 593-600. (Year: 2014).*

Huang et al. "Skin Lesion Correspondence Localization in Total Body Photography", Oct. 2023, Springer, MICCAI 2023, LNCS 14226, p. 260-269. (Year: 2023).*

Huang et al. "Skin Lesion Correspondence Localization in Total Body Photography", Oct. 2023, Springer, MICCAI 2023, LNCS 14226, p. 260-269. (Year: 2023) (Year: 2023).*

* cited by examiner

PERSISTENT COORDINATES SYSTEM FOR IMAGE PROCESSING

BACKGROUND OF THE INVENTION

Technical Field

The present invention relates generally to imaging devices. More specifically, the invention relates to a method and apparatus for high-resolution total body photography using a persistent, body-wide coordinate system that can identify and re-identify specific locations on a human subject across time, pose, and imaging conditions.

Background of the Invention

Medical imaging and dermatological diagnostics increasingly rely on repeatable, high-resolution documentation of anatomical and dermatological features over time. Current systems for tracking body surface features (e.g., pigmented lesions, surgical scars, anatomical landmarks) often don't employ a universally persistent coordinate system. This can cause inconsistencies in documenting lesion location across visits, such as when patients' poses, lighting, or body morphology vary.

Moreover, existing methods for documenting and tracking anatomical features are often slow and labor-intensive. Clinicians frequently rely on manual annotation or subjective visual comparisons. These processes can be time-consuming and error-prone, especially when documenting lesions taken during different visits or under varied conditions.

Many advanced imaging systems require complex post-processing workflows to achieve accurate alignment and tracking. This slows down clinical decision-making, reduces scalability, and increases the risk of human error in diagnosis. The inefficiency of current solutions creates a barrier for widespread use, particularly in time-sensitive or resource-constrained clinical settings.

One of the central challenges in longitudinal skin and anatomical feature tracking is the absence of a persistent, body-wide coordinate system that can robustly identify anatomical locations on a human subject across time, pose, and imaging conditions. In many clinical workflows, such as dermatological surveillance, aesthetic treatments, or post-surgical monitoring, image records are taken. And so, without a consistent spatial reference, comparisons between scans become unreliable, manual, and error-prone-leading to inefficiencies and potential diagnostic oversights.

Efforts to address this issue have primarily focused on improving image alignment and registration techniques between timepoints. These include methods ranging from traditional feature matching and landmark detection [Kanazawa et. al] to volumetric models such as pose estimation [Boukhayma et. all, Kolotouros et al.] or linear blend skinning frameworks [Lin et. al]. Most of these mentioned systems, however, are computationally intensive, requiring large models or complex post-processing pipelines that are impractical for routine use in mobile or point-of-care devices.

Additionally, current approaches to anatomical localization—particularly in dermatology—are often ad hoc. Clinicians may rely on hand-drawn diagrams, subjective notations ("left shoulder, medial side"), or manual annotations on photographs. These methods are neither scalable nor interoperable across systems. In workflows involving large-scale imaging, such as total body photography (TBP), the issue compounds: hundreds of features may be present in each image, but there is a need for a methodology for indexing, tracking, or comparing them across timepoints. As a result, longitudinal tracking relies on human memory or re-identification heuristics, both of which are error-prone.

Techniques such as volumetric pose estimation and linear blend skinning have been explored to improve anatomical modeling and motion tracking. While these methods can produce highly accurate representations of human pose and surface deformation, they are computationally intensive and require the storage and processing of large volumes of data. This poses a significant challenge for implementation on small, portable devices such as tablets or smartphones, which are commonly used in clinical and field settings. The high memory and compute demand of these approaches make them impractical for real-time use, limiting their applicability in workflows that require fast, on-device processing and consistent performance across hardware platforms.

SUMMARY OF THE INVENTION

The present invention is a Persistent Coordinate System (PCS) that enables durable, fine-scale localization of dermatological and anatomical features across time, pose, and imaging sessions. PCS assigns stable spatial identifiers to points on the template mesh and live feed through joint markers, silhouettes, or other lightweight pose estimation cues. It then uses these pose estimation cues to align and translate the template mesh to the live feed viewer. For a given lesion of interest, we can identify the rigid body segment it is a part of, and then compute the relative coordinates for that point (with respect to the rigid body) in either the live viewer/template mesh. We can then reconstruct the relative coordinates for the opposite view type (live view or template mesh) through estimation techniques. This results in a reversible mapping between real-world observations and consistent anatomical locations, without requiring a deformable mesh for the initial estimation.

This coarse localization provides a robust and efficient anatomical reference that is agnostic to capture modality, enabling clinicians to reliably track and annotate features such as lesions, injection sites, or procedural regions. By using a lightweight alignment pipeline and avoiding dependence on detailed surface scans, the system is practical for both mobile capture environments and clinical imaging setups. The template-based coordinate space allows consistent referencing of points across timepoints, even in the presence of pose and morphological variation.

For applications requiring greater spatial precision, such as longitudinal lesion monitoring or subtle surface tracking, PCS incorporates an optional fine-resolution refinement process. This stage begins by registering source and target scans to a shared anatomical template using template deformation techniques, followed by transferring texture and lesion signals onto the template surface. A smooth vector field is then computed across the mesh to align appearance features and lesion likelihoods, correcting for non-isometric deformation and residual misalignment. When 2D photography is available, PCS uses the rough estimate to restrict the search space and select optimal view pairs for template matching across images, improving both computational efficiency and matching robustness.

The combination of coarse anatomical grounding and fine-grain refinement enables PCS to support a wide range of clinical use cases with varying precision and resource requirements. Whether used as a lightweight anatomical index for quick annotations or as a foundation for sub-millimeter lesion tracking across timepoints, PCS provides a persistent, interoperable spatial framework suitable for dermatology, aesthetics, surgery, and rehabilitation in both high-end and point-of-care settings.

Improvements on Pre-Existing Inventions

The invention introduces a Persistent Coordinate System (PCS) that significantly advances the state of anatomical localization and longitudinal tracking. It addresses critical shortcomings in existing systems by offering a lightweight, modular, and scalable framework that can function across devices, settings, and precision needs—from mobile capture to clinical-grade surface refinement.

The improvements on pre-existing devices and methods include:

Lightweight, Mobile-First Architecture

Conventional anatomical tracking solutions rely on resource-intensive models, complex post-processing pipelines, or multi-camera capture systems, limiting their use to research or controlled clinical settings. In contrast, PCS is architected for mobile devices and point-of-care environments. It uses pose-aware alignment with minimal inputs—such as 2D joint markers or body silhouettes—to compute stable anatomical coordinates through perspective-n-point (PnP) projection and barycentric encoding over a static template mesh. This does not require a 3D reconstruction or deformable modeling during initial estimation, which allows for fast, real-time localization on smartphones, tablets, and low-resource hardware. This is particularly impactful for telemedicine mobile applications, where patients and providers interact asynchronously for lesion monitoring or follow-up care.

Operates in Uncontrolled Environments

PCS eliminates the dependency on calibrated cameras, depth sensors, or dermoscopic-quality imagery. It can function using single-view RGB captures under variable lighting, low resolution, and varying pose conditions common in at-home or rural settings. This contrasts with legacy methods that require SMPL-based body fitting, dense surface scans, or clinically controlled imaging protocols. PCS enables robust operation even on consumer-grade devices and with casual captures, significantly expanding accessibility.

Persistent, Reusable Anatomical Coordinates

Whereas many existing systems provide momentary registration between two images or frames, PCS creates anatomical coordinates that persist across timepoints. Once a lesion or region is localized, it is mapped to a surface point on a canonical mesh using barycentric coordinates. This identifier can be reused across future visits—even years apart—independent of pose or capture method. This persistent reference model supports continuity of care and reduces annotation effort.

Coarse-to-Fine Architecture for Precision on Demand

PCS introduces a novel two-stage pipeline. The rough estimation stage offers immediate and lightweight anatomical localization, while the optional fine-resolution stage adds precision through deformable template registration, signal transfer, and surface vector field refinement. Crucially, the coarse estimation is not only sufficient for many clinical workflows but can also inform the refinement stage, for example, by narrowing the search space for relevant 2D images during lesion matching or texture alignment. This coordination between coarse and fine stages optimizes both performance and efficiency, a capability absent from prior systems.

Bidirectional Referencing Between Image and Mesh

PCS supports both forward and reverse mappings between real-world images and anatomical coordinates. A lesion identified in a 2D photo can be mapped to a coordinate on the mesh, and that coordinate can later be reprojected onto newly captured images—even under different poses or viewpoints. This enables clinicians to re-localize previously identified sites without repeating annotation, streamlining follow-up workflows, and improving clinical accuracy.

Scalable, Standardized Spatial Referencing

Unlike systems that rely on free-text notations (e.g., "lower back, near shoulder blade") or manual region drawings, PCS provides a quantitative and standardized coordinate system that can be shared across patients, providers, and institutions. This supports population-scale applications such as total body photography (TBP) databases, epidemiological research, AI-based lesion classification, and procedural documentation, all while reducing variability and ambiguity in anatomical labeling.

Anatomical Flexibility Without Anatomical Overhead

PCS delivers anatomical generality without the burden of full-body surface modeling or medical imaging. While the fine-resolution stage optionally leverages a deformable mesh (e.g., SMPL-NICP) for refinement, the system's default operation only requires a lightweight template mesh and pose-based alignment. This hybrid design provides anatomical realism where needed, while maintaining the simplicity and speed required for real-world use.

BRIEF DESCRIPTION OF THE DRAWINGS

The drawings presented herein show illustrative embodiments of the disclosure. They do not illustrate all embodiments. Other embodiments may be used in addition to or instead of the illustrative embodiments. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps. The drawings are not intended to depict every feature of every implementation, nor the relative dimensions of the depicted elements, and are not drawn to scale.

DETAILED DESCRIPTION

In the following description, numerous specific details are set forth to clearly describe various specific embodiments disclosed herein. One skilled in the art, however, will understand that the subject matter of the present disclosure may be practiced without all of the specific details discussed below. In other instances, well-known features may not have been described so as not to obscure the invention with unnecessary detail regarding known features.

The present invention provides a Persistent Coordinate System (PCS) for spatially referencing and tracking anatomical features on a human subject across time, pose, and imaging conditions. The invention enables consistent, pose-aware localization of any point on the human body using a deformable mesh model aligned to patient-specific imaging data. PCS functions as a dynamic anatomical referencing framework, which may be implemented using a combination of geometric modeling, image-based pose estimation, and bidirectional coordinate mapping. The system is adaptable to different imaging contexts and operates independently of precise camera replication, fixed imaging setups, or high-resolution feature capture.

Figure 1:
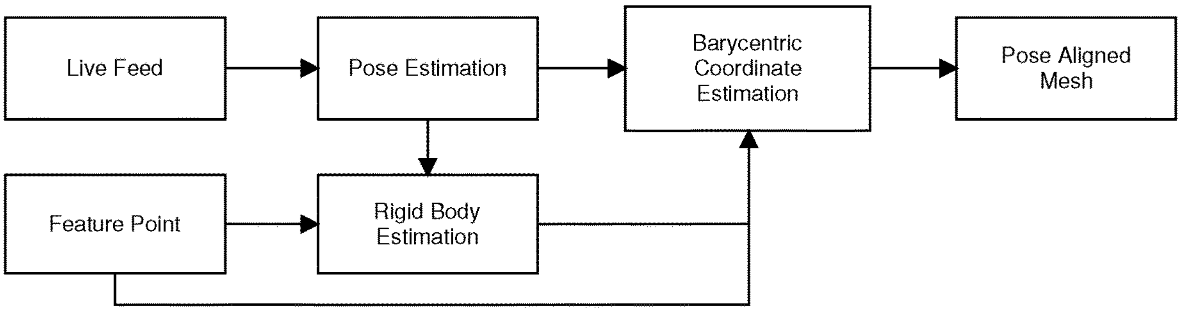
FIG. 1 is a diagrammatic illustration of information flow for the transformation from Live Feed and Feature Point to Pose Aligned Mesh.
Figure 2:
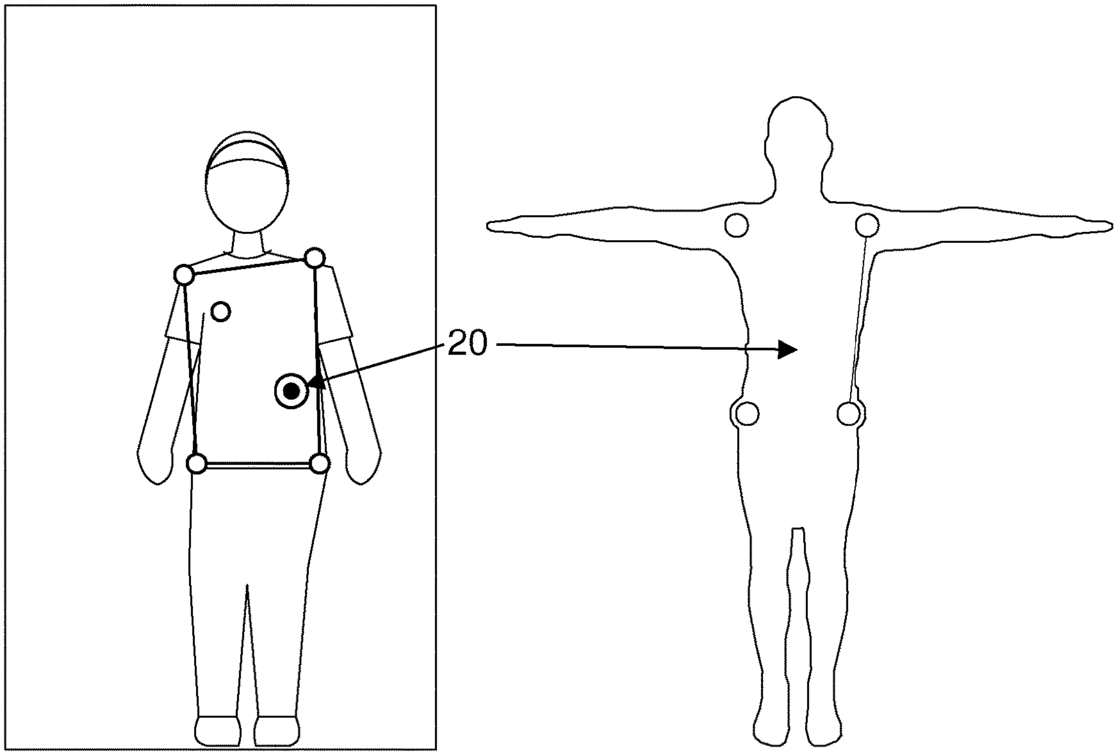
FIG. 2 is an example of rough persistent coordinates between live-feed and template mesh using the torso rigid body.
Figure 3:
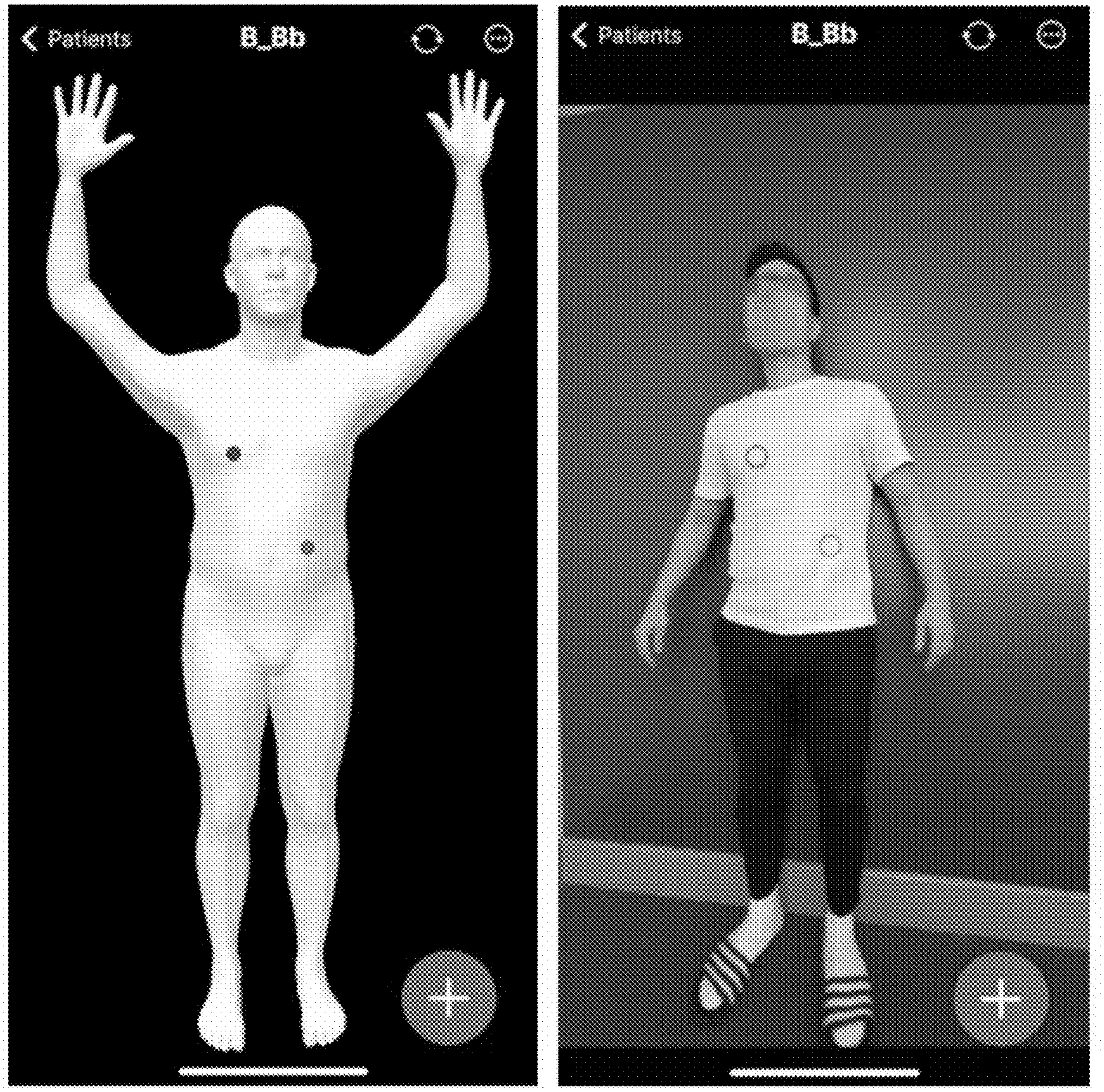
FIG. 3 is a side-by-side comparison for a view of an adopted 3D avatar (left) and a live view of a human subject (right)
Figure 4:
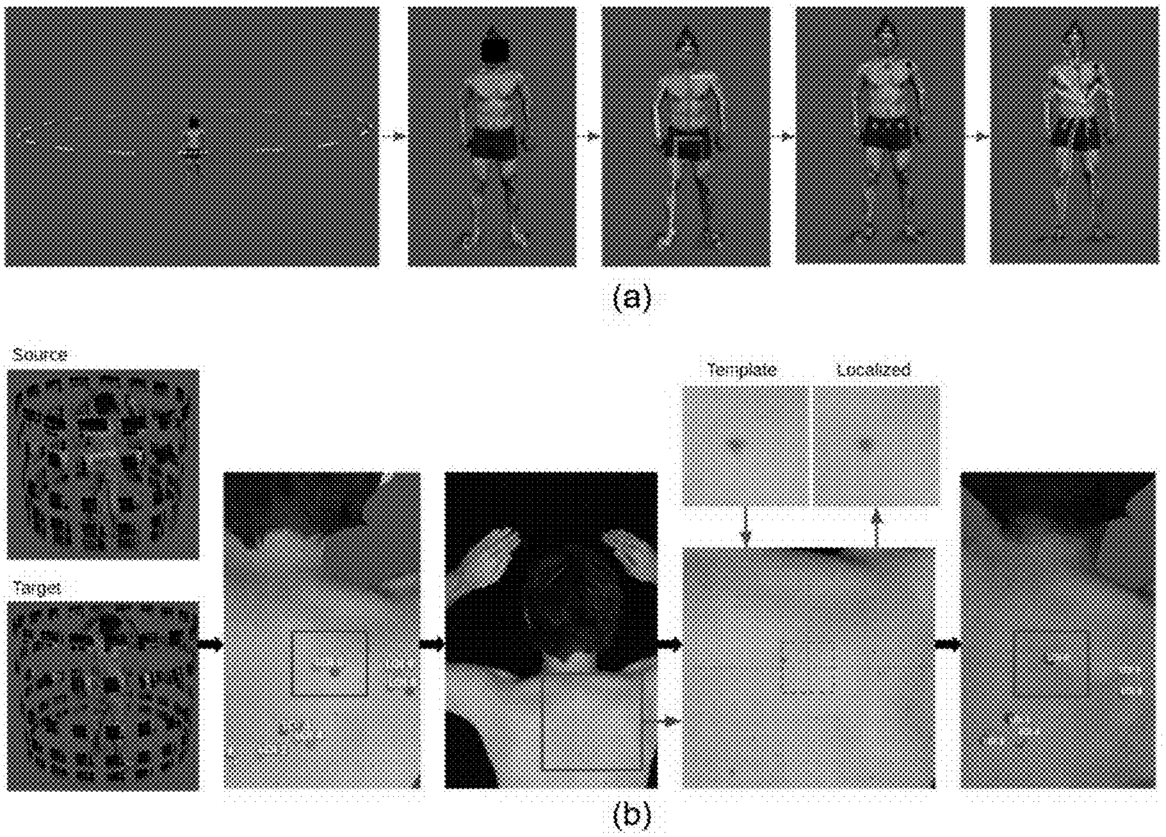
FIG. 4 illustrates the process of matching lesions using both 2D images and 3D meshes of total body photography in an embodiment of the invention.
Figure 5:
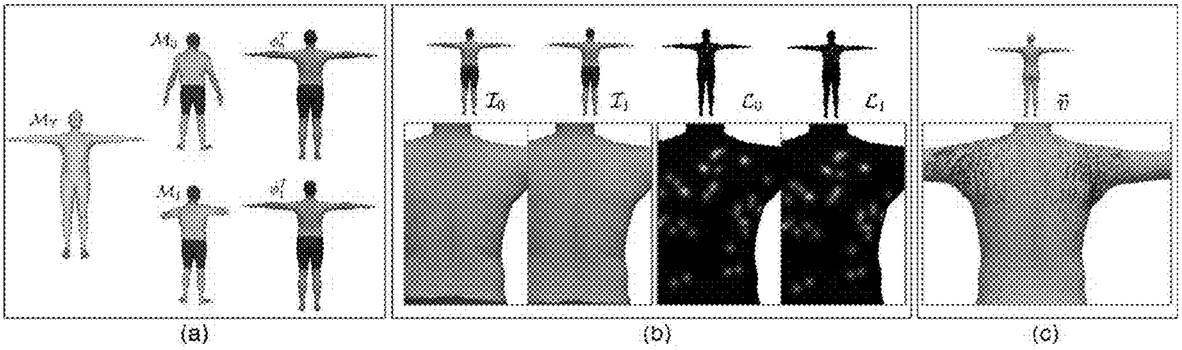
FIG. 5 illustrates an embodiment that matches lesions using a 3D textured mesh.
Figure 6:
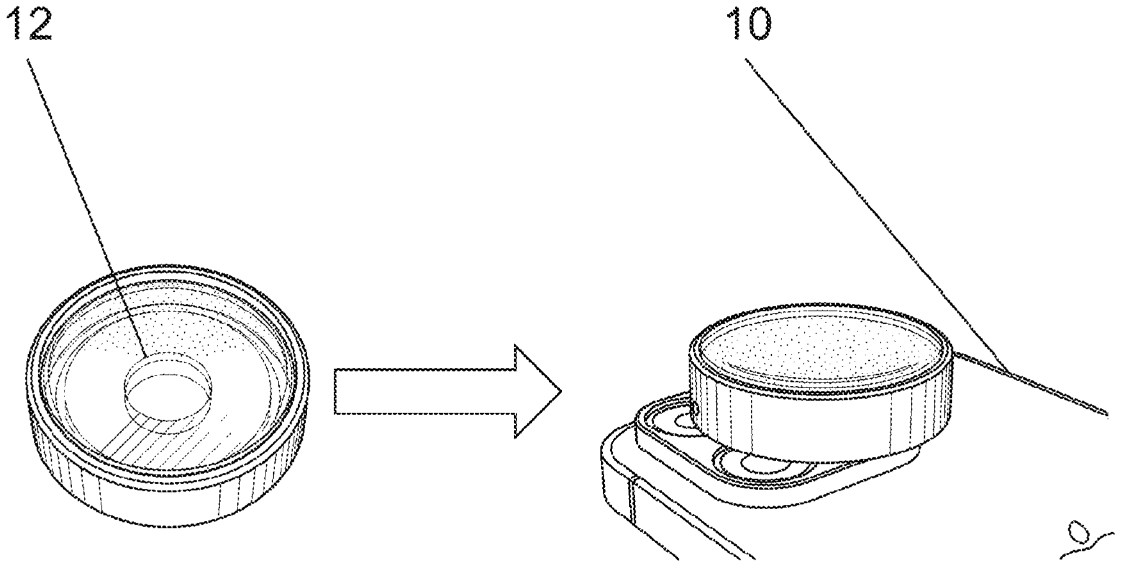
FIG. 6 shows an iPhone attachment used in an embodiment of the PCS algorithm of the invention.

Referring now to FIGS. 1-6, the invention will be described. FIG. 1 shows information flow for transformation from live feed and feature point to pose-aligned mesh (after PnP or other transformation) in the Barycentric Coordinate Estimation embodiment as will be explained in more detail later. FIG. 2 shows an example of rough persistent coordinates between live-feed and template mesh using the torso rigid body. The shoulders and the left side of the body are used to estimate the barycentric coordinates of the point to translate between template and live view representations. FIG. 3 displays a side-by-side comparison for a view of an adopted 3D avatar (left) and a live view of a human subject (right). The colored dots 20 show how the system maintains precise spatial relationships between the 3D avatar and actual patient views, offering clinicians a robust tool for consistent lesion tracking and documentation. FIG. 4 shows an embodiment, discussed below, to match lesions using both 2D images and 3D meshes of total body photography, wherein the 3D meshes are reconstructed from the 2D images. (a) shows the landmark-based feature representation to construct a coarse correspondence map between the source and target scan. (b) shows the refinement of lesion location using template matching. The template matching is performed in 2D images once a pair of images in correspondence is found. FIG. 5 illustrates an embodiment to match lesions using 3D textured mesh. (a) shows the template mesh $\mathcal{M}_T$, the source mesh ($\mathcal{M}_0$), the target mesh ($\mathcal{M}_1$), and the correspondence maps from the source/target to the template. (b) shows the source and the target texture signals, the source and the target lesion signals. (c) visualizes a solved vector field that explains the difference between the source and the target signals while being smooth and small. The vector field is used to update correspondence maps that are subsequently used for lesion assignment. FIG. 6 shows a smartphone attachment 30 used in an embodiment of the PCS algorithm for light-weight lesion localization. Attachment 30 is axially aligned with one of the lenses 32 of the smartphone 34. Attachment 30 can stay on the entire procedure and supports both rough and fine-grain PCS techniques.

Template Mesh Construction

The initialization of the PCS system is through an anatomical mesh which serves as the coordinate system for spatial mapping. This template mesh may be either generic or subject-specific, depending on the clinical context and available data.

In one embodiment, a generic mesh could be derived from statistical shape models such as SMPL or SCAPE. These models may be parametric, allowing control over body shape and pose through learned parameters, or non-parametric, consisting of fixed geometry with high vertex resolution.

In another embodiment, the mesh is subject-specific, created from previously acquired patient data such as CT, MRI, structured light scans, depth-sensors, or photogrammetric reconstructions.

The template mesh may be enhanced with semantic anatomical labels, subdividing it into regions such as the head, trunk, limbs, and hands, or more granular zones depending on application requirements. It may also include reference markers, such as specific vertices labeled as anatomical landmarks (e.g., joints or bony prominences) to facilitate alignment with pose estimation outputs.

The template mesh can be static, remaining fixed across all imaging sessions, or deformable, supporting local warping or global transformations to better conform to individual subject morphology. Deformation may be performed using skinning weights, Laplacian surface editing, or optimization against observed 3D data, either in real time or as a preprocessing step.

In some configurations, the mesh is reconstructed dynamically during image acquisition using multi-view stereo, photometric stereo, or depth fusion. This allows the PCS to function without requiring prior scans, enabling use in mobile or low-resource clinical settings.

Pose Estimation from Live Imaging

Pose estimation within the PCS system refers to the process of identifying the anatomical configuration of a human subject from input visual data. This process extracts spatial markers—including 2D body landmarks, joint locations, and region boundaries—from images or video frames to facilitate alignment with a canonical mesh model.

The system receives an image or frame sequence containing a human subject in arbitrary pose and applies a combination of landmark detection and silhouette analysis to determine the subject's configuration. Landmark detection serves as the primary input modality and produces a set of 2D anatomical keypoints representing body joints. These landmarks are extracted using pretrained pose estimation models such as OpenPose [Cao et al., 2017] or MediaPipe [Lugaresi et. al], which predict skeletal joint positions or regress dense correspondences from image space to mesh surface coordinates.

In addition to keypoint-based detection, the system incorporates silhouette data and body region segmentation to provide spatial context and enhance geometric consistency (eg. BodyPix). Silhouettes are obtained via foreground segmentation techniques and define the outer contour of the body within the image. This contour can be used to constrain keypoint locations—ensuring landmarks lie within the silhouette boundary—and to ensure that width information and skin distortions don't negatively affect the accuracy of the prediction.

Similarly, semantic segmentation of body regions (e.g., torso, arms, legs) may be performed using pixel-wise classification networks (eg. BodyPix). These segmented regions enable the system to assign landmark groupings to specific anatomical zones, assisting in downstream tasks such as rigid body decomposition and region-specific interpolation.

The pose estimation module can then integrate multiple visual cues: discrete landmarks provide high-confidence joint locations, silhouettes contribute global shape information, and segmented regions define anatomical boundaries. These complementary signals are combined to construct a pose configuration, which may include joint coordinates, limb orientations, and segmented surface regions.

Post-processing is applied to improve pose stability and accuracy. Low-confidence landmarks may be excluded or interpolated based on neighboring points; temporal smoothing filters may be applied in video input to reduce jitter; and silhouette contours may be regularized to remove background noise. In multi-camera configurations, 2D landmarks are triangulated to obtain 3D joint positions for more accurate mesh alignment.

The final output of this stage is a set of pose markers that define the subject's current configuration in image space. These markers are used to transform or deform the canonical mesh such that it reflects the observed posture, enabling persistent spatial referencing of anatomical features across frames, viewpoints, or imaging sessions.

Rigid Body Segmentation

To support localized coordinate referencing and deformation modeling, the PCS system decomposes the human body into a collection of rigid or semi-rigid anatomical regions. These regions serve as independently transformable units, each with its own local coordinate frame, allowing for region-specific mapping and interpolation that respects anatomical motion constraints.

Rigid body regions correspond to anatomical structures that exhibit limited internal deformation during motion, such as the thighs, shins, forearms, upper arms, pelvis, thorax, and head. The segmentation process can be derived from several techniques from using the pose marker analysis.

One method to derive the rigid body segmentation is through pose marker groupings, where spatially or kinematically connected landmarks—such as shoulder to elbow to wrist—define the boundaries of limb segments. These marker chains are used to infer rigid limb segments according to predefined kinematic models of human articulation.

To refine these boundaries and capture body parts that may not be easily defined by landmarks alone (e.g., the torso or back), the system incorporates geometric features extracted from silhouette contours. Discontinuities in curvature, concavities along the silhouette boundary, or limb occlusions can reveal natural segment boundaries, particularly in complex poses. This allows the segmentation to respond to pose-dependent visual cues even in the absence of dense landmark coverage.

In some embodiments, the system also applies learned body part segmentation networks that assign each pixel or region of the body to a semantic class (e.g., upper leg, abdomen, neck). These predictions are used to resolve ambiguous or overlapping marker assignments, especially in cases of foreshortening, self-occlusion, or limited image resolution.

Each resulting rigid or semi-rigid region is associated with a local coordinate frame. This frame may be defined using anatomical landmarks (e.g., joint triplets forming a plane), region centroids, or principal axes derived from local point distributions. The decomposition into rigid regions not only facilitates accurate forward and inverse mapping but also enables modular transformation of mesh segments, allowing pose-aware warping without requiring global deformation. This local segmentation thus underpins the PCS system's ability to perform anatomically consistent spatial referencing across variable poses and imaging conditions.

Local Coordinate Encoding (Barycentric System)

To spatially reference an anatomical feature identified in the image, the PCS system encodes the feature's location relative to a local anatomical rigid body region using a coordinate system that remains consistent across pose changes. This local encoding allows the selected point—such as a lesion, fiducial marker, or anatomical landmark—to be persistently tracked on the deformable mesh, even as the subject's body undergoes movement or reorientation.

In one preferred embodiment, the system encodes the location of the selected feature using barycentric-like coordinates defined by a series of reference triangles constructed in the image space. The triangle is formed by taking the feature point as one vertex and pairs of two additional reference points as the base (FIG. 2). These base points may include pose landmarks (e.g., joints), contour intersections (e.g., silhouette boundaries), or nearby segmented region anchors. The selection of base points may be automatic or informed by regional context, such as proximity, anatomical stability, or visibility.

The resulting barycentric coordinates represent the spatial relationship of the selected point to its local frame and are computed in the 2D image domain prior to projection onto the mesh. Because the triangle is constructed within a rigid or semi-rigid body, the barycentric encoding remains pose-invariant within that region. This enables consistent localization of the point across imaging sessions where the body region may undergo translation, rotation, or slight deformation, but maintains internal rigidity.

Although barycentric coordinates provide a simple and efficient encoding mechanism, the PCS system is not limited to this approach. In alternative embodiments, the location of the selected point may be encoded using:

Polar coordinate systems centered around joint landmarks or anatomical pivots which are useful for encoding relative distances and angles in limb segments.

Surface-based geodesic coordinates, computed along the skin or mesh topology, which provide deformation-invariant localization in highly curved or articulated regions.

UV map coordinates derived from template mesh parameterization, enabling mapping through learned correspondences or surface texture registration.

Principal axis projections or PCA-based local frames, especially in arbitrary or irregular body regions where predefined anatomical frames are unavailable.

The choice of coordinate system may be dynamically selected based on feature type, body region, imaging conditions, or data availability. The encoding remains local to the rigid region defined in the previous segmentation step, ensuring that it can be used for accurate mapping onto the canonical mesh model and robust inverse projection back to future image frames.

Rough Projection onto the Template Mesh (Forward Mapping)

After the feature point is encoded in local coordinates—such as barycentric, affine, or geodesic coordinates—within a rigid or semi-rigid region of the image, the next step is to project this local structure onto the template mesh. This process anchors the image-based anatomical feature to a consistent spatial reference in the mesh coordinate system, forming a persistent coordinate that remains stable across different imaging frames, poses, and sessions.

The projection begins by aligning the template mesh to the subject's current pose. This alignment transforms the canonical mesh into a pose-adjusted configuration that matches the anatomical orientation of the subject as observed in the input image. The alignment may be achieved through a kinematic transformation consisting of rotation and translation operations, derived directly from the set of pose markers estimated previously. Each rigid body region may be individually transformed based on its associated landmark configuration, preserving anatomical relationships between segments.

In certain embodiments, pose alignment is refined using geometric optimization techniques. For example, the system may solve a Perspective-n-Point (PnP) problem to determine the camera-to-mesh transformation based on known 2D-3D correspondences, or apply Iterative Closest Point (ICP) algorithms to minimize the distance between observed pose markers or silhouettes and corresponding mesh points.

Once the mesh is pose-aligned, the system projects multiple reference triangles—defined in image space—onto the corresponding anatomical region of the mesh. These projections use the local coordinate encoding to interpolate multiple mesh surface locations that correspond to the selected feature. The average of all such predictions is computed to give a highly accurate estimation of the feature point on the template mesh. The resulting mesh point becomes the persistent coordinate for the anatomical location of interest. It serves as a canonical spatial reference that can be tracked, queried, or transformed in subsequent stages as can be seen in FIG. 2)

To improve projection accuracy, the system may apply refinement steps based on image or prior data. In one embodiment, silhouette warping is used to align the mesh's boundary with the subject's silhouette extracted from the image, ensuring better conformance to the observed contour. Additionally, the system may incorporate anatomical priors or previously acquired patient-specific data to constrain deformation, enforcing anatomically plausible alignment and improving robustness in regions with low visual contrast or partial occlusion.

The result of this process is a stable, anatomically meaningful coordinate on the mesh surface that represents the original image-space feature in a persistent, pose-independent format. This coordinate can later be used for back-projection, longitudinal tracking, or multi-modal integration as described in subsequent sections.

Rough Inverse Mapping from Mesh to Image (Back Projection)

Inverse mapping of a selected point on the template mesh back to the image uses the same pipeline but in reverse. For a point on the mesh, the system performs the following steps:

Landmark Detection on Mesh: The system identifies anatomical landmarks on the template mesh using the pose estimation models.

Mesh Alignment to Live Image: With the detected landmarks, the mesh is aligned and scaled to match the subject's pose in the live image feed (affine transformation). This alignment is needed since the mesh's position and orientation must correspond with the image perspective.

Rigid Body Identification: Using anatomical segmentation algorithms, the system determines the rigid body segment of the mesh to which the feature point belongs.

Barycentric Coordinate Calculation: The feature point is expressed in barycentric coordinates relative to the vertices of the rigid body segment on the mesh. These coordinates represent the point's relative position within the rigid segment.

Mapping onto the Live Image: Given the barycentric coordinates on the rigid body section, the system calculates the corresponding 2D location of the feature point in the current image frame. This inverse mapping allows the persistent coordinate defined on the mesh to be accurately projected back and forward with live images.

Fine-Grain PCS

The PCS optionally incorporates a fine-resolution refinement process to improve the coarse localization. Starting from a coarse correspondence map, the finer correspondence map can be established using signals from color, texture, and other medical-related contexts to adjust the misalignment. The invention provides PCS solutions to finding lesions in correspondence across total body photography (TBP) scans. Depending on the image modality, separate implementations of the fine-grain refinement for PCS for 2D TBP images and for 3D textured meshes in TBP are provided.

Fine-Grain PCS for 2D TBP

The following is an embodiment of fine-grain PCS used in 2D image space. The fine-grain PCS is then used for lesion matching in total body photography (TBP). Given 2D TBP images and the 3D meshes reconstructed from the 2D TBP images (e.g., photogrammetry-reconstruction), the first step is to construct a coarse correspondence map between the source and target scan using body landmarks, such as body joints and facial keypoints. The second step is to find corresponding pairs of 2D wide-field-of-view images in the source and the target. Once a pair of images in correspondence is found, we can perform lesion matching using keypoint matching for paired images (e.g., Superpoint [DeTone et al., 2018] and LightGlue [Lindenberger et al., 2023]). Finally, for the matched lesions, we can refine the location of lesions in correspondence using template matching.

Landmark-Based Correspondence Map

Given a 3D textured mesh $\mathcal{M}$, an orbital path is created around the mesh to generate virtual cameras and a synthetic 2D image at each camera position. For each synthetic 2D image, a learning-based method (e.g., OpenPose [Cao et al., 2017]) is used to detect facial features and body joints. Similar to BODYFITR [Saint et al., 2019], the 3D locations of body landmarks on the textured mesh can be derived through back-projection: For a landmark detected in a 2D synthetic view at the homogeneous coordinate $p=[p_x, p_y, 1]^T$, its 3D coordinate can be represented as $l=K^{-1}p$, $l \in \Re^3$, where K is a 3×4 camera matrix. A 3D ray is defined with the camera position $c \in R^3$ as its origin and with the ray direction $(l-c) \in R^3$. Finally, ray-casting is applied to get the intersection between the 3D ray and the mesh. We estimate a vertex $v \in \mathcal{M}$ on the surface for each landmark to enable the computation of geodesic distance along the surface in subsequent steps. Note that there could be multiple candidates for the 3D point locations of the landmarks from multiple synthetic views. The confidence level of the predicted landmarks can be used to select the best view for each landmark and then calculate the 3D location of the landmark from the selected view.

Each vertex $v \in R^3$ in the 3D mesh with S landmarks $L=\{l_i\}$, $l_i \in R^3$, $i=1 \rightarrow S$, can be mapped into a S-dimensional vector representation based on the geodesic distances from the vertex to all the landmarks. Formally, the mapping $z_{shape}: R^3 \rightarrow R^S$ can be defined as:

$$z_{shape}(v) = [f(g(v, l_1)), f(g(v, l_2)), \ldots, f(g(v, l_S))]^T \in R^S,$$

where $g(v, l_i)$ is the geodesic distance between the vertex v and the $i^{th}$ landmark, and f(.) is a function of geodesic distance.

The feature representation of a vertex should give preference to closer landmarks when comparing the similarity between two feature vectors. Therefore, we experimented with $$f(g)=\sqrt{\frac{1}{g}},\ f(g)=\frac{1}{g},\ f(g)=\frac{1}{g^2},$$

and f(g)=max G−g, G={g(v, $l_i$)} and empirically found out that $$f(g)=\frac{1}{g}$$

gives the best descriptiveness as a feature representation. Therefore, the selected shape feature representation of a vertex is:

$$z_{shape}(v)=\left[\frac{1}{g(v,l_1)},\frac{1}{g(v,l_2)},\ \dots\ ,\frac{1}{g(v,l_S)}\right]^T\in R^S.$$

Paired Views Selection

From the coarse correspondence map, for each vertex in the source, its correspondence in the target in the 3D mesh can be derived. Starting from a lesion of interest (LOI) in the source, its corresponding vertex in the target is located. To select a pair of source and target views for the lesion of interest, a notion of the view quality of a lesion in a 2D image can be defined by the camera-to-lesion distance and the incident angle from the camera to the lesion. Let $v\in\mathcal{M}$ be the vertex for an LOI and $n\in\Re^3$ be the normal vector of the vertex, for a given camera view with camera position $c\in\Re^3$, the view quality $\zeta$ for the lesion can be defined as:

$$\zeta=-\frac{(v-c)\cdot n}{\|v-c\|}.$$

Therefore, the view selection among a set of camera views is the same as solving:

$$c^*=\underset{c\in C}{\operatorname{argmax}}-\frac{(v-c)\cdot n}{\|v-c\|}.$$

Template Matching

For a source LOI, given a fixed crop size W×H in pixels enclosing the lesion, a template image for the LOI can be acquired as $I_{template}$. Template matching is then used to refine the pixel coordinate ($p_x$,$p_y$) of the LOI on a selected target 2D image $I_{target}$:

$$(p_x^*,p_y^*)=\arg\max_{(p_x,p_y)\in I_{target}} ssim(I_{template},I_{crop}(p_x,p_y)),$$

where $I_{crop}$($p_x$,$p_y$) is the crop image centered at ($p_x$,$p_y$) with size W×H, and ssim(.,.) is the similarity measure of two images.

The window size for template matching is 25×25 pixels, while the search region is 100×100 pixels in an original image of resolution 580×870 pixels. Template matching is performed by using normalized cross-correlation (NCC) and LPIPS scores as our metrics. Empirically, NCC is more discriminative for comparing images with high similarities whereas the LPIPS score is more robust to the change of perspective. Therefore, if the 2D TBP images share many common perspectives, the optimal matched result from NCC is used if its LPIPS score is higher than a threshold (0.9). Otherwise, the remaining sub-optimal matches are selected from NCC with the highest LPIPS score.

Fine-grain PCS for 3D TBP

The following is an embodiment of lesion matching using 3D textured mesh of total body photography. The first step computing correspondence maps bringing the source and target meshes to a template mesh. Using these maps to define source/target signals over the template domain, a flow field aligning the mapped signals is constructed. The initial correspondence maps are then refined by advecting forward/backward along the flow field. Finally, lesion assignment is performed using the refined correspondence maps.

Problem Statement

Given a template mesh $\mathcal{M}_{\mathcal{T}}$, source and target meshes $\mathcal{M}_0$, $\mathcal{M}_1$, and two sets of detected lesions $X_0\subset\mathcal{M}_0$, $X_1\subset\mathcal{M}_1$, it would be beneficial to find correspondence maps $$\phi_0^{\mathcal{T}}:\mathcal{M}_0\to\mathcal{M}_{\mathcal{T}}\text{ and }\phi_1^{\mathcal{T}}:\mathcal{M}_1\to\mathcal{M}_{\mathcal{T}},$$

and a matching matrix $\pi=\{0,1\}^{(|X_0|+1)\times(|X_1|+1)}$ minimizing an energy of consisting of two terms:

$$E_{X_0,X_i}(\phi_0^{\mathcal{T}},\phi_1^{\mathcal{T}},\pi)=\sum_{X_0,X_1}E_{DistanceProximity}(\phi_0^{\mathcal{T}},\phi_1^{\mathcal{T}},\pi)+E_{Stochasticity}(\pi).$$

That is, what is desired is a pair of corresponding source and target lesions to be close to each other while encouraging the correspondence matrix to be doubly stochastic.

By adding a dummy lesion to each of the lesion sets in $\pi$, the matching function can account for unmatchable lesions. Specifically, assuming a lesion in the source scan can be matched to at most one lesion in the target scan and vice versa, we also enforce:

$$\sum_{j=0}^{|X_1|}\pi_{i,j}\ \&=1,\ \forall\ i=1,\ \dots\ ,|X_0|$$

$$\sum_{i=0}^{|X_0|}\pi_{i,j}=1,\ \forall\ j=1,\ \dots\ ,|X_1|$$

(where $\pi_{i,0}$=1 indicates a match between the i-th lesion on the source and the target's dummy lesion). Since the dummy lesions can be matched multiple times, the sums involving the dummy lesions can be greater than 1.

Template-Based Coarse Correspondence

The starting point is constructing a coarse correspondence map between the source/target and a template mesh. The approach from Marin et al. [Marin et al., 2024] is used to acquire a deformed template mesh registered to the source/target mesh that allows construction of the correspondence map.

Given an input mesh, Marin proposes a localized neural fields network in which a neural field is dedicated to a local region of body shape to predict the vertex displacement of the template mesh (SMPL model [Loper et al., 2023]). The parameters of the neural field are then refined using Iterative Closest Point [Besl et al., 1992] through backpropagation.

Then, the updated neural field is utilized to register the SMPL model to the input, followed by a refinement that optimizes Chamfer distance.

The method is denoted as SMPL-NICP. Let $\mathcal{M}_\mathcal{T}$ be the template mesh, for an input mesh $\mathcal{M}_i$, i={0, 1}, the output from SMPL-NICP is a deformed template mesh (i.e. with the same topology as the original template) whose geometry is registered to that of $\mathcal{M}_i$.

A correspondence map is defined as $$\phi_i^\mathcal{T}:\mathcal{M}_i \to \mathcal{M}_\mathcal{T},$$

by first deforming the template mesh to $\mathcal{M}_i$ and then finding, for every point p∈ $\mathcal{M}_i$, the nearest surface point on the deformed template.

Similarly, a correspondence map is constructed $$\phi_\mathcal{T}^i:\mathcal{M}_\mathcal{T} \to \mathcal{M}_i$$

by finding the closest surface point on the input mesh $\mathcal{M}_i$ for each point on the deformed template mesh. It is noted that $$\phi_i^\mathcal{T} \text{ and } \phi_\mathcal{T}^i$$

are not inverses of each other since two different points on the source/target can have the same closest point on the deformed template.

Lesions may be located anywhere on the surface on the mesh. To this end, barycentric coordinates are used to encode a point on the mesh: p∈ $\mathcal{M}$ ↔($t^p$, {$\alpha^p$, $\beta^p$, $\gamma^p$}) where $t^p$ indexes the triangle containing p and {$\alpha^p$, $\alpha^p$, $\gamma^p$} are the barycentric coordinates of p inside the triangle ($0\leq\alpha^p$, $\beta^p$, $\gamma^p\leq 1$ and $\alpha^p+\beta^p+\gamma^p=1$).

Using this encoding, mesh correspondences are represented as vertex-to-surface-point maps, taking the vertices on one mesh to points on the second mesh:

$$\Phi_i^j:\mathcal{V}_i \to \mathcal{M}_j$$

is represented by a $\mathbb{R}.^{|V_i|\times 1}$ matrix. The $1^{th}$ row in $$\Phi_i^j$$

maps the $1^{th}$ vertex $$v_i^l \in \mathcal{V}_i$$

to a point in $\mathcal{M}_j$ in the barycentric encoding.

Given a vertex-to-surface-point correspondence map $$\Phi_i^j:\mathcal{V}_i \to \mathcal{M}_j,$$

the barycentric encoding is used to extend it to a surface-point-to-surface-point correspondence map $$\Phi_i^j:\mathcal{M}_i \to \mathcal{M}_j.$$

Concretely, to find the correspondence of a surface point p∈ $\mathcal{M}_i$ to the mesh $\mathcal{M}_j$, the three vertices of the triangle containing the point p are mapped onto the mesh $\mathcal{M}_j$, interpolate the positions of the imaged vertices using the barycentric coordinate of p, and then find the point on $\mathcal{M}_j$ closest to the interpolant.

Formally, for a point $$p \leftrightarrow (t^p, \{\alpha^p, \beta^p, \gamma^p\}) \in \mathcal{M}_i \text{ with } \mathcal{F}_i(t^p) = (v_0^p, v_1^p, v_2^p)$$

representing the triangle containing p, there is:

$$\phi_i^j(p) = \text{argmin}_{q\in\mathcal{M}_j}\left\|\alpha^p\cdot\Phi_i^j(v_0^p) + \beta^p\cdot\Phi_i^j(v_1^p) + \gamma^p\cdot\Phi_i^j(v_2^p) - q\right\|.$$

Flow-Field-Based Refinement

The template-based correspondence maps are coarse for two reasons. First, when fitting a template mesh to source/target scan, non-isometric deformation is present at locations near body joints and locations of soft tissues. Second, misalignment between the deformed template mesh and the input mesh occurs if the body pose of the input mesh is far from the canonical "T" pose. Since the coarse correspondence map relies on the nearest point on the registered template mesh to the query point, such a misalignment degrades the accuracy of the mapping. Consequently, a pair of corresponding points in the source and the target will not map to the same position on the template mesh. To refine the correspondence map, the texture and lesion signals of the source/target are transferred to the template mesh using the source/target-to-template correspondences. The next step is to construct a vector field on the template mesh that aligns the transferred signals.

Signal Construction on Template Mesh:

Let $F_i$: $\mathcal{M}_i \to \mathbb{R}$. be a signal on mesh $\mathcal{M}_i$, then transfer the signal to the template mesh using the correspondence map, to define a signal on the template $$F_i^\mathcal{T} \equiv F_i \circ \phi_\mathcal{T}^i : \mathcal{M}_\mathcal{T} \to \mathbb{R}.$$

Two types of input signals are considered, a texture signal and a lesion signal.

Texture signal: A triplet of color signals is constructed on the template mesh, using the colors in the texture map acquired by the TBP, $$\mathcal{I}_0^c, \mathcal{I}_1^c : \mathcal{M}_\mathcal{T} \to \mathbb{R},$$

with c∈{R,G,B}. Lesion signal: We construct lesion signals on the template mesh using lesion signals defined on the source/target meshes, $\mathcal{L}_0$, $\mathcal{L}_1$: $\mathcal{M}_\mathcal{T} \to \mathbb{R}$.. The source/target lesion signals represent the likelihood of a surface point being a lesion. To create the lesion signal, we diffuse a sum of delta functions centered at the lesion positions and normalize the signal across the surface with the maximum signal value to create a scalar-per-vertex signal.

Surface Optical Flow

Starting with a template mesh $\mathcal{M}_T$, source/target texture signals $$\mathcal{I}_0^c, \mathcal{I}_1^c,$$

and source/target lesion signals $\mathcal{L}_0$, $\mathcal{L}_1$, surface optical flow is determined. The goal is to define a tangent vector field $\bar{v}$ on the template mesh such that advection along the field best aligns the source and target signals. The flow field $\bar{v}$ is defined as the minimizer of the energy:

$$E(\vec{v}) = \underbrace{w_{\mathcal{I}} \cdot \sum_{i \in \{0,1\}, c \in \{R,G,B\}} \int_{\mathcal{M}\mathcal{T}} \left(\langle \nabla \mathcal{I}_i^c, \vec{v} \rangle - (\mathcal{I}_0^c - \mathcal{I}_1)\right)^2 dp}_{texture\ fitting}$$

$$\underbrace{+ w_{\mathcal{L}} \sum_{i=0}^{1} \int_{\mathcal{M}\mathcal{T}} \left(\langle \nabla \mathcal{L}_i, \vec{v} \rangle - (\mathcal{L}_0 - \mathcal{L}_1)\right)^2 dp}_{lesion\ fitting}$$

$$+ \epsilon \cdot \underbrace{\int_{\mathcal{M}\mathcal{T}}}_{smoothness} \nabla \vec{v}(p)^2 dp + \varepsilon \cdot \underbrace{\int_{\mathcal{M}\mathcal{T}}}_{size} \vec{v}(p)^2 dp$$

with the first and the second terms penalizing the failure of the vector field to explain the difference in the texture signal and the lesion signal respectively, the third term encouraging the smoothness of the flow, and the fourth term regularizing the norm of the flow to respect the initial correspondence map. We follow the approach proposed by Prada et al., solving for the flow field $\bar{v}$ hierarchically.

Update of Correspondence Map

With the vector field $\bar{v}$ defined on $\mathcal{M}_T$, the correspondence map $$\phi_0^{\mathcal{T}} \text{ and } \phi_1^{\mathcal{T}}$$

is updated by advecting the positions of correspondence forward and backward along the vector field halfway, separately. Formally, there is:andwith $\exp_p$: $T_p \mathcal{M}_T \to \mathcal{M}_T$ the exponential map taking vectors in the tangent space at $p \in \mathcal{M}_T$ to positions on $\mathcal{M}_T$.

Lesion assignment: Given source/target correspondence maps $$\phi_i^{\mathcal{T}} : \mathcal{M}_i \to \mathcal{M}_{\mathcal{T}},$$

it is expected lesions, to $x_0 \in X_0$ and $x_1 \in X_1$ to be in correspondence if the geodesic distance between $$\phi_0^{\mathcal{T}}(x_0) \text{ and } \phi_1^{\mathcal{T}}(x_1)$$

is small. Conversely, it is anticipated that $x_0 \in X_0$ (resp. $x_1 \in X_1$) will be unmatched if the geodesic distance from $$\phi_0^{\mathcal{T}}(x_0) \text{ to } \phi_1^{\mathcal{T}}(x_1)$$

for all $x_1 \in X_1$ (resp. from $$\phi_1^{\mathcal{T}}(x_1) \text{ to } \phi_0^{\mathcal{T}}(x_0)$$

for all $x_0 \in X_0$) is large. These observations are formalized, expressing the assignment matrix $\pi \in \{0, 1\}^{(|X_0|+1) \times (|X_1|+1)}$ as the minimizer of the energy:

$$E_{X_0,X_1}(\pi) = \alpha \sum_{x_0 \in X_0, x_1 \in X_1} \pi(x_0, x_1) \cdot D_{\mathcal{T}}\left(\phi_0^{\mathcal{T}}(x_0), \phi_1^{\mathcal{T}}(x_1)\right) + \beta\left[\sum_{x_0 \in X_0} \pi\left(x_0, x_1^{|X_1|+1}\right) + \sum_{x_1 \in X_1} \pi\left(x_0^{|X_0|+1}, x_1\right)\right]$$

where $D_{\mathcal{T}} : \mathcal{M}_T \times \mathcal{M}_T \to \mathbb{R}.^{\geq 0}$ is the geodesic distance function on $\mathcal{M}_T$. The assignment problem can be optimized through the Kuhn-Munkres algorithms [Munkres et al., 1957]. The implementation in Pygmtools [Wang et al., 2024] may be used to solve the minimizer to the equation above.

The following is an embodiment of lesion matching verification using piece-wise rigid body assumption for 3D textured mesh. Given matches $\{(x_0, x_1), x_0 \in X_0, x_1 \in X_1\}$ for detected lesions in the source and target scans, the level of confidence is defined for matches based on piece-wise rigid body assumption for a group of at least 3 lesions.

Lesion Partitioning

A body segmentation $\mathcal{B}_{\mathcal{M}_T}$ defined in a template mesh $\mathcal{M}_T$ is relied on to partition lesions into body segments, $\mathcal{B}_{\mathcal{M}_T} : \mathcal{V}_T \to \{1, \ldots, B\}$, $\mathcal{V}_T \in \mathcal{M}_T$. By deforming the template mesh to fit a given 3D mesh, body part label is assigned to each lesion using the label of the closest vertex on the deformed SMPL model. Let $\mathcal{M}_{T'}$ be the deformed template mesh and M be a given mesh, for a lesion a $x \in \mathcal{M}$ there is:

$$\mathcal{B}_{\mathcal{M}}(x) = \mathcal{B}_{\mathcal{M}_{\mathcal{T}'}}\left(v*(x()), v*(x) = \operatorname{argmin}_{v \in \mathcal{M}_{\mathcal{T}'}} |v - x|\right.$$

Rigid Transformation for Body Segment

For a body segment labeled as $b \in \{1, \ldots, B\}$, a rigid transformation $H \in SE(3)$ is estimated to align the two sets of lesion pairs that at least one of the lesion in a lesion pair belongs to the body segment:

$$H = \operatorname{argmin}_{R,t} \sum_{\pi(x_0,x_1)=1 \wedge (\mathcal{B}(x_0)=b \vee \mathcal{B}(x_1)=b} \|x_1 - H(R, t)x_0\|^2,$$

where $R \in SO(3)$ is the rotation and $t \in \Re^3$ is the translation of components of H. It is noted that the correct matches at the body segment should give the minimum sum for all possible matching permutations. In practice, given initial corresponding pairs, the matches are verified if the associated cost is a local minimum using the Iterative Closest Points algorithm.

Multi-Session and Multi-Modal Compatibility

The PCS system is designed to function robustly across varying imaging sessions, sensor modalities, and temporal intervals, enabling persistent anatomical referencing in heterogeneous clinical and non-clinical environments. This cross-context operability allows anatomical features to be localized, tracked, and re-identified across space, time, and imaging modality, without requiring rigid setup constraints or repeated manual annotation.

Once a feature is encoded as a persistent coordinate on the template mesh, it can be consistently mapped to any subsequent image or data modality—regardless of when, how, or with which device the new data is acquired. For example, a lesion initially identified in a mobile phone image can later be rediscovered in a high-resolution DSLR photograph captured months afterward, even under different lighting conditions and subject poses. Similarly, surgical markers documented during a clinical procedure can be projected into live augmented reality (AR) visualizations for follow-up, using the same persistent mesh-based coordinate reference.

The PCS system supports cross-modality transfer, allowing coordinates to be preserved across imaging types such as visible light (RGB), depth sensors (structured light, time-of-flight), and infrared (IR). Because spatial referencing is maintained in mesh coordinates—rather than being tied to any particular image frame or pixel layout—features remain accessible regardless of the imaging modality used for acquisition or review.

In addition, the system supports cross-temporal consistency, enabling the same anatomical coordinate to be revisited across longitudinal sessions. This facilitates clinical use cases such as tracking the progression of skin lesions, monitoring wound healing, or verifying treatment effects across months or years.

The PCS framework is also designed to operate across multi-device imaging pipelines. Whether images are captured from handheld devices, head-mounted cameras, dermatological imaging systems, or diagnostic scanners, the system translates local image-space observations into mesh-space representations that are device-agnostic. This abstraction layer ensures that coordinate references are portable, repeatable, and interpretable across platforms.

Together, these capabilities allow the PCS to serve as a unified anatomical reference across diverse imaging contexts. This enables automated feature tracking, cross-session indexing, multi-modal data fusion, and a broad range of downstream applications in clinical, research, and augmented reality domains.

One such embodiment for the rough estimation pipeline is through a mobile application that computes persistent coordinates in real-time for lesion localization. Accompanying the mobile application is a physical attachment 12 (FIG. 6) which rests directly on the user's smartphone camera 10, providing a mobile device for image scanning. This attachment has an opening for the wide lens of a smartphone camera, a light source, and polarizing film. Unlike most phone dermatoscope attachments, the inventive device does not include any external magnification.

In this embodiment with the phone attachment, a clinician is allowed to record a lesion on a template mesh and use the rough persistent coordinate to locate where it would be on the body in AR (FIG. 3). Using the AR viewer, they can then navigate to the lesion of interest and take a close-up picture of the lesion using the attachment, which is then sent through the fine-grain PCS for location refinement. Since the attachment does not require magnification, they are able to compute both a rough and fine-grain PCS.

The invention claimed is:

1. An anatomical localization method for generating persistent coordinates of a location on a human body across multiple digitally generated images acquired at different time points, the method comprising:

generating a template mesh representing a surface of a human body, the surface including predefined anatomical regions and reference structures;

determining a pose of a human subject from image data comprising at least one of RGB images, RGB-D images, video images, infrared images, or volumetric image data;

segmenting the human body into a plurality of rigid or semi-rigid anatomical segments based on at least one of the determined pose or image-derived geometry;

encoding a location on the human body by computing coordinates of the location within a local coordinate frame defined for one of the anatomical segments using reference geometry derived from the image data;

projecting the encoded coordinates onto the template mesh to generate a persistent spatial coordinate defined in a coordinate space of the template mesh, the persistent spatial coordinate being invariant to changes in subject pose across the different time points;

re-projecting the persistent spatial coordinate from the template mesh into subsequently acquired images or imaging modalities to enable at least one of feature tracking, localization, or annotation propagation over time; and selectively refining the persistent spatial coordinate to improve spatial consistency across the different time points, wherein the encoding and projecting steps are performed without constructing a subject-specific deformable mesh of the human subject at the time the persistent spatial coordinate is generated.

2. The method of claim 1, wherein each individual subject is represented using the same generic template mesh.

3. The method of claim 1, wherein determining the pose of the human subject comprises of keypoint detection, wherein silhouette estimation for contour estimation and two-dimensional body region segmentation for determining rigid body boundaries may be configured but are not required.

4. The method of claim 1, wherein encoding the location comprises computing spatial coordinates relative to pose estimation landmarks using at least one of: pairwise triangulation, barycentric coordinates, affine coordinates, polar coordinates, or surface geodesic coordinates on the template mesh.

5. The method of claim 1, wherein projecting the encoded coordinates comprises aligning non-rigid mesh body parts to the determined pose using at least one of: skeletal kinematic transformations, Perspective-n-Point optimization, or Iterative Closest Point refinement as an affine transformation prior to encoding.

6. The method of claim 1, wherein alignment accuracy is further improved by using image-derived silhouette boundaries, texture-based deformations, or anatomical prior constraints to provide further contextual information for coordinate encoding by constraining encoded points in conjunction with the pose estimation landmark references.

7. The method of claim 1, wherein re-projecting the persistent spatial coordinate is performed in real time for video sequences or live image streams.

8. The method of claim 1, wherein the persistent spatial coordinate enables multimodal reference mapping between different imaging devices, acquisition times, or imaging modalities.

9. The method of claim 1, wherein the location corresponds to a skin lesion, abrasion, surgical marker, or other surface characteristic.

10. The method of claim 1, wherein selectively refining the persistent spatial coordinate comprises:

mapping a plurality of persistent coordinates associated with two different time points onto the template mesh;

generating correspondence signals for the persistent coordinates at each time point based on at least one of diffused locational signals, texture, color, lesion confidence, lesion severity, or disease classification; and computing a flow field on the template mesh from the correspondence signals to refine alignment of the persistent coordinates between the two time points.

* * * * *